April 13, 1965   E. F. REISS ETAL   3,178,244
MODULAR ENCLOSURE
Filed March 31, 1961   5 Sheets-Sheet 1

INVENTORS
EDMUND F. REISS
KENNETH M. JOHNSON
WALTER J. MACFARLANE
BY Lindsey, Prutzman and Hayes
ATTORNEYS

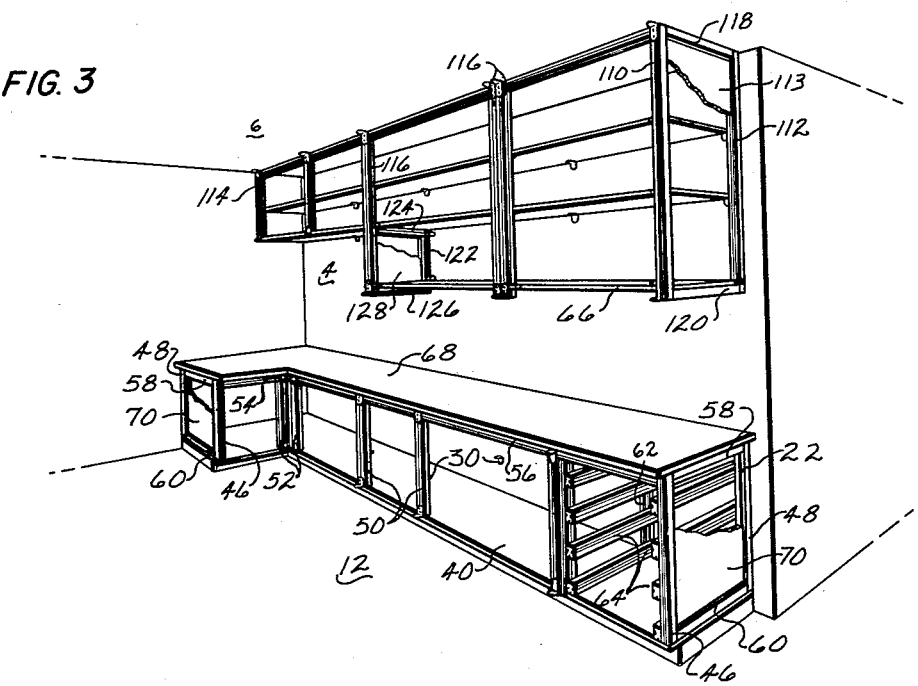

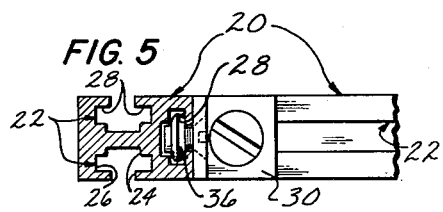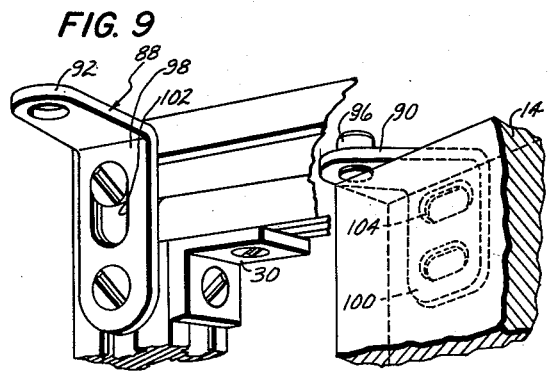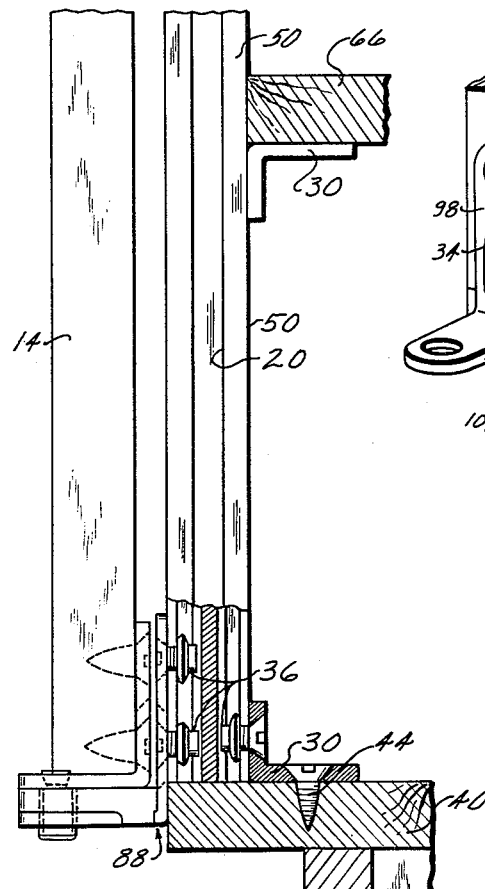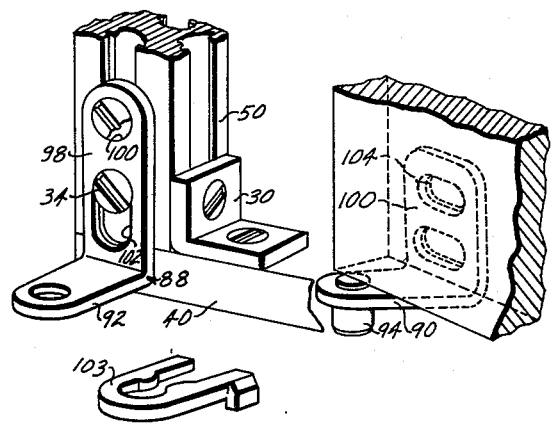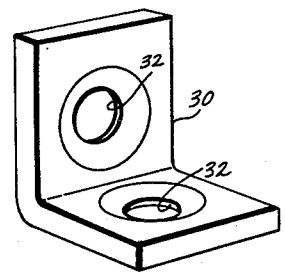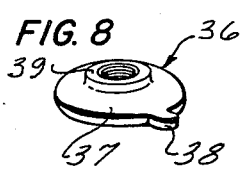

April 13, 1965  E. F. REISS ETAL  3,178,244
MODULAR ENCLOSURE
Filed March 31, 1961  5 Sheets-Sheet 4
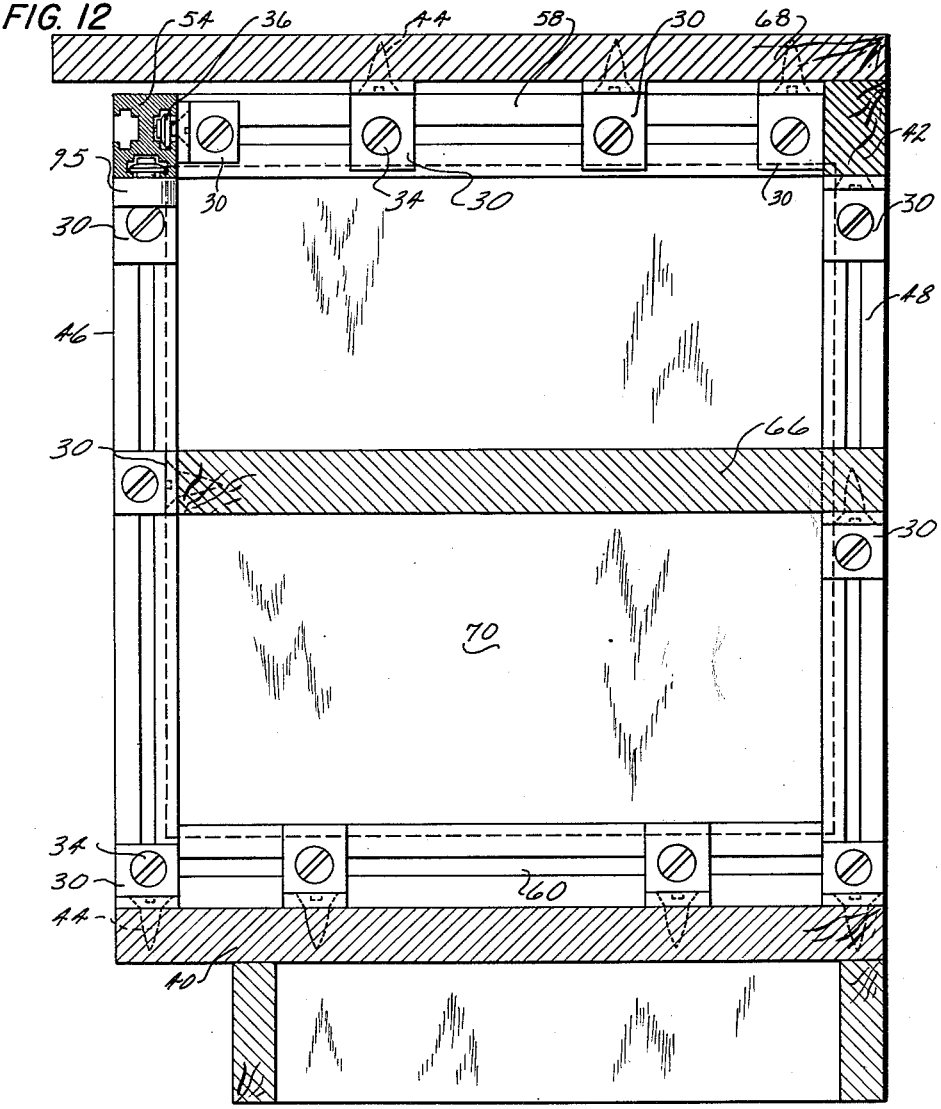
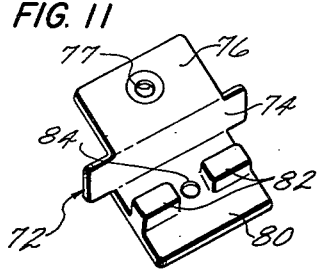
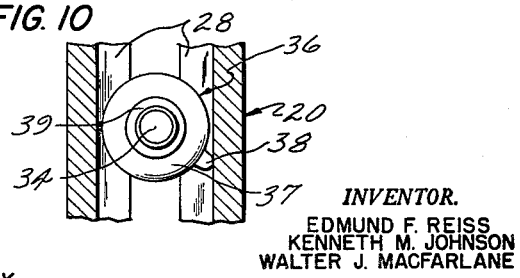
INVENTOR.
EDMUND F. REISS
KENNETH M. JOHNSON
WALTER J. MACFARLANE
BY Lindsey, Crutzman and Hayes
ATTORNEYS

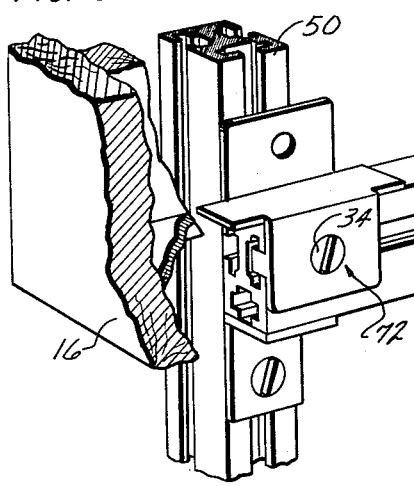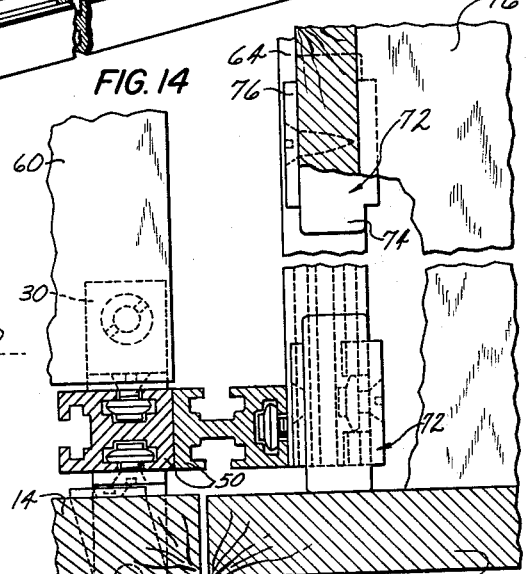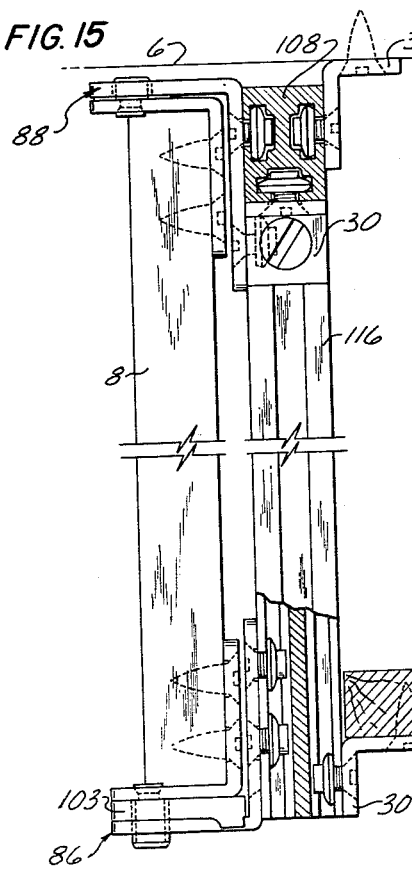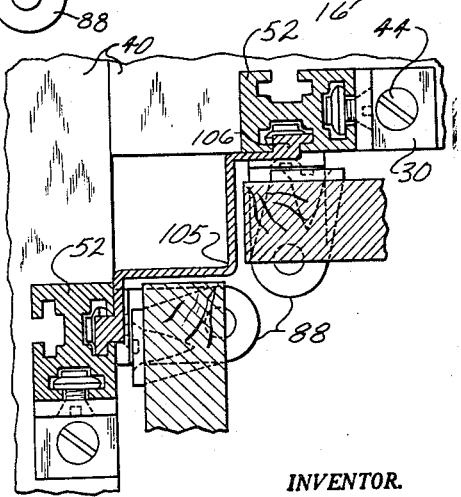

United States Patent Office 3,178,244
Patented Apr. 13, 1965

3,178,244
MODULAR ENCLOSURE
Edmund F. Reiss, New Britain, Kenneth M. Johnson, Kensington, and Walter J. MacFarlane, New Britain, Conn., assignors to The Stanley Works, New Britain, Conn., a corporation of Connecticut
Filed Mar. 31, 1961, Ser. No. 99,870
17 Claims. (Cl. 312—257)

The present invention relates to enclosures such as cabinets, counter bases and the like, and more particularly to a novel modular construction therefor provided by basic structural elements which are readily variable and quickly assembled or disassembled.

It is an aim of the present invention to provide a modular enclosure construction of highly pleasing appearance provided by basic structural elements which are relatively economical, readily variable and easily transported in packages of small size.

Another aim is to provide a modular enclosure construction of basic structural elements which is easily and speedily erected on the job site even by relatively inexperienced workmen and which enables the facile correction of minor deviation in alignment of walls.

It is also an aim of the present invention to provide a modular enclosure construction which requires a minimum of inventory for various enclosure designs and utilizing a small number of basic components which can be stored in a relatively small space.

A further aim is to provide a modular enclosure construction wherein the components may be shipped disassembled and in prefinished condition so that finishing of the enclosure is not required after assembly with the attendant reduction in job site labor.

Still another aim is to provide a modular enclosure construction wherein the components may be pre-assembled into sub-assemblies of small bulk in the shop and then transported to the job site where the may be readily assembled.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 3 is the cabinet installation of FIG. 1 in an intermediate stage of assembly with portions of the end wall panels broken away;

FIG. 4 is an enlarged perspective view of the left hand or corner base cabinet section in FIG. 1 with the door removed and a portion of the end panel broken away;

FIG. 5 is an enlarged view of a pair of structural members showing their connection and the cross-sectional configuration;

FIG. 6 is an enlarged fragmentary longitudinal section of a structural member showing its mounting upon the platform and the connection of various components thereto;

FIG. 7 is a perspective view of the angle bracket used for connecting various components;

FIG. 8 is a perspective view of a nut member;

FIG. 9 is a fragmentary and partially exploded view of a door assembly in the base cabinet;

FIG. 10 is an enlarged fragmentary longitudinal section of a structural member showing the locking nut member as seated therein;

FIG. 11 is an enlarged perspective view of the outer side of a drawer guide;

FIG. 12 is an enlarged fragmentary section along the line 12—12 of FIG. 4;

FIG. 13 is an enlarged fragmentary perspective view of a drawer mounting assembly;

FIG. 14 is a fragmentary top sectional view of a drawer mounting assembly;

FIG. 15 is a fragmentary side elevational view of the overhead cabinet door mounting assembly; and FIG. 16 is an enlarged fragmentary section of the corner post assembly along the line 16—16 of FIG. 4 and showing the doors as mounted thereon.

Figure 1:
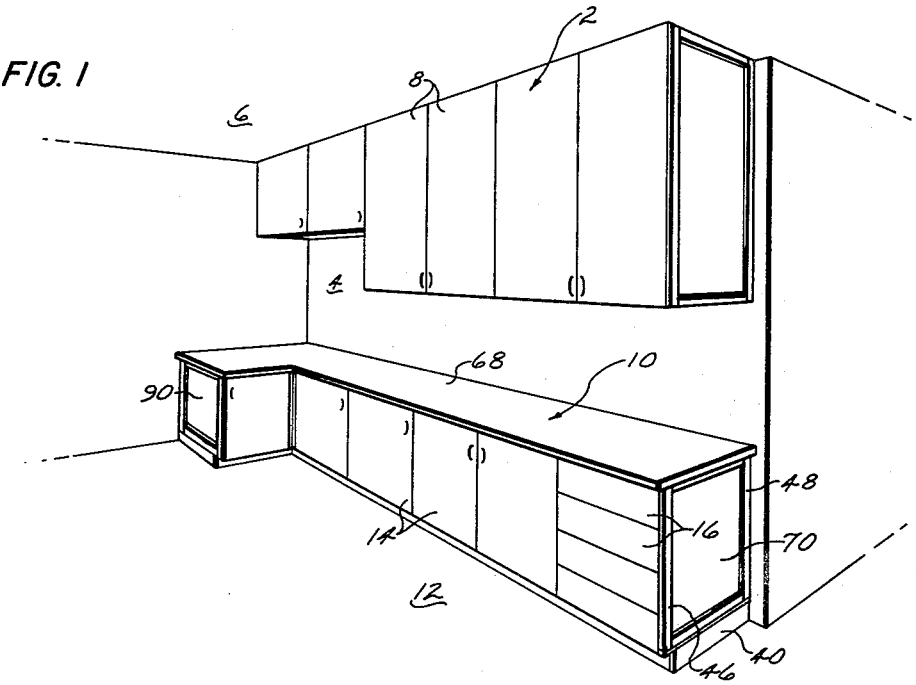
FIG. 1 is a perspective view of a finished wall cabinet and base cabinet utilizing the modular construction and components of the present invention.

Referring first to FIG. 1 of the drawings, there is illustrated a finished kitchen cabinet installation utilizing the modular construction of the present invention and generally comprised of an elevated or wall cabinet 2 mounted upon the wall 4 adjacent the ceiling 6 and having a plurality of pivotally mounted doors 8, and a counter base cabinet 10 supported upon the floor 12 and having pivotally mounted doors 14 and drawers 16. Both elevated wall cabinets and floor supported cabinets will be generally referred to hereinafter as "cabinets."

As best seen in FIGS. 2–6, the cabinets 2 and 10 utilize a skeletal framework of structural members, the cross-section of the structural member being shown in FIG. 5 and therein generally designated by the numeral 20. As shown in FIG. 5 (and FIGS. 6 and 7), the structural members 20 are extruded metal members of rectilinear cross-section and have longitudinally extending slots 22 in three faces thereof. Each of the slots 22 has a channel portion 24 extending normally to the face in which it is located and a locking portion 26 of greater width than and intermediate the length of the channel portion 24 which extends parallel to the face so as to provide shoulders 28 on opposite sides of the channel portion 24. The slots 22 may be described as cross-shaped or generally T-shaped. These structural members are cut to predetermined length for use as the various vertical and horizontal structural elements of the framework, generally referred to as stiles and rails, respectively. The structural members are conveniently precut by the manufacturer to predetermined standard lengths for modular enclosure construction according to specifications and plans permitting variation in the final assembly.

As best shown in FIGS. 5–8 and 10, the structural members 20 are joined together in rigid right angular assembly by angle brackets 30 having legs disposed at right angles and having apertures 32 in each leg which register with the slots 22 in the members to be joined. The brackets 30 are secured in the slots by engagement of bolts 34 which extend through the apertures 32 and into the slots 22, and lock in threaded engagement with nuts 36 which are drawn tightly against the shoulders 28 on the opposite sides of the channel portion 22. The nut 36 has a generally circular configuration with a dish-shaped base portion 37 and a cylindrical stem portion 39. As seen from the drawings, the dish-shaped portion 37 is of greater diameter than the width of the channel portion 24 of the slot 22 and is provided with a radial projection or finger 38 which butts against the wall of the locking portion 26 and prevents further rotation of the nut 36, thus facilitating threaded engagement and disengagement of the bolt 32. The bolt and nut are preferably tightened sufficiently to produce some flattening of the dish-shaped portion 37 which will cause the edges thereof to bite into the metal of the extrusion while simultaneously providing great holding pressure. The brackets 30 are secured to wood, laminated plastic and the like by wood screws 44.

Referring first to the illustrated embodiment of a base or floor supported cabinet utilizing the components and modular construction of the present invention, there is preferably constructed a wooden platform 40 to elevate the cabinet from the floor and function as a supporting horizontal planar surface for the cabinet. A horizontal wooden stringer 42 is mounted on the wall 4 with its upper surface at a predetermined height. Vertical structural members or stiles are secured to the platform 40 in predetermined position by angle brackets 30 which are fastened in one of the slots 22 by bolts 34 and are secured to the platform 40 by the wood screws 44. The end wall framing or skeleton is provided by a pair of spaced end wall posts 46, 48 having slots 22 in opposed alignment, and the back posts 48 are secured at the upper end by an angle bracket 30 to the bottom of the stringer 42. Dependent upon the length of the cabinet and the desired installation, a number of intermediate or center posts 50 of shorter length than the end wall posts are erected, and, in the case of the illustrated embodiment, corner posts 52 of the same height as the center posts 50 are also erected to provide the L-shaped construction.

Extending horizontally between the upper end of the front end wall posts 46 and resting upon the corner posts 52 are front tie members 54, 56 which are secured to the posts 46, 52 by angle brackets 30, which provide the top frame members for the cabinet. The tie member 56 also rests upon the top of the center posts 50 which are rigidly fastened thereto by the angle brackets 30.

In the illustrated embodiment, front-to-back tie members 58 extend horizontally between the end wall posts 46, 48 at the top thereof to enhance the appearance and increase the rigidity of the structure and cooperate with the similarly extending bottom facing member 60 to frame the end wall panel. The tie member 58 is secured at its front end to the horizontal tie member 54 and at its rear end to the horizontal stringer 42 by angle brackets 30. The bottom facing member 60 is simply secured to the platform 40 by angle brackets 30. If so desired, the front-to-back tie members (not shown) may be provided along the length of the horizontal tie member 56 extending between it and the horizontal stringer 42.

In the illustrated embodiment, a drawer support post 62 is also provided at the back wall 4 adjacent the end of the right hand cabinet in alignment with the center post 50 and is secured in place by brackets 30 which attach it to the platform 40 and stringer 42. The end wall posts 46, 48, drawer post 62 and center post thus define a rectilinear unit or subassembly. In FIGS. 3, 12 and 13, horizontal drawer runners 64 have been secured between the center post 50 and drawer support post 62 and between the end wall posts 46, 48. These runners 64 are disposed inwardly of the framework defined by the several posts with slots 22 thereof in opposed horizontal alignment, and are rigidly secured to the several posts by brackets 30.

In this manner, the structural skeleton for the base cabinet 10 is provided by predetermined lengths of the structural member, the angle brackets 30 and the several fastening members.

Other angle brackets 30 are mounted at the desired height upon the various vertical posts and upon the wall 4 to provide support for shelves 66. In those instances where there is no slot 22 available for supporting the shelf vertically upon one leg of the bracket 30, particularly in the instance of the front end wall posts, the angle bracket 30 is mounted horizontally in a side slot of the extrusion and fastened into the edge of the shelf 66, as is clearly shown in FIG. 12 of the drawings. A number of brackets 30 have one leg secured to the horizontal tie members 54, 56, the front-to-back tie members 58, and along the horizontal stringer 42, with the other leg extending horizontally along the underside of the countertop 68. Wood screws 44 firmly fasten the countertop 68 to the structural framework and thus provide a rigid assembly.

Seated in the opposed slots 22 of the end wall posts 46, 48, and the correspondingly aligned slots 22 of the front-to-back tie members 58 and lower facing members 60 are end wall panels 70 of wood, laminated sheet material, or the like. These wall panels 70 are inserted into the end wall posts prior to placement of the upper front-to-back tie member 58 and the countertop 68. If the vertical spacing to the wall cabinet 2 will not permit sliding the end panels 70 vertically into the end posts 46, 48, the panels can be inserted prior to securing the front end wall post 46 or assembled in the end wall section prior to fastening it into place.

Referring next to the drawer assembly as best shown in FIGS. 11, 13 and 14, the drawers 16 are slideably supported on the horizontal drawer runners 64 by drawer guides 72 of plastic material having a low coefficient of friction, such as nylon, "Delrin" and linear polyethylene. As seen in FIGS. 11 and 13, the drawer guides 72 have a base portion 74 which glides upon the top surface of the drawer runners 64, an upstanding side wall portion 76 at the outer side margin of the base with an aperture 77 through which a screw 78 may be fastened into the side of the drawer 16, and a depending portion 80 extending along the side of the drawer runner 64 and having a pair of inwardly extending spaced lugs 82 which extend into the slot 22 of the drawer runner 64 and thereby guide the drawer smoothly thereupon.

In the illustrated structure, a pair of these guides 72 are fastened adjacent the rear end of the drawer 16 by screws 78 and a second pair of guides 72 are locked into the slot 22 of the runners 64 at the front end thereof by bolts 34 extending through locking apertures 84 in the depending portion 80 to provide a drawer stop while also providing a smooth bearing surface and guide for the drawer as it moves thereover. If fixed drawer guides are not employed, then several guides 72 may be spaced along the length of the drawer.

Referring next to the pivot mounting assembly for the doors and specifically to FIGS. 6 and 9–15, the hinges 86, 88 are comprised of a door leaf 90 and cabinet leaf 92 which are pivotally connected by pivot pins 94, 96, and the leaves 90, 92 have right angularly disposed mounting flanges 98, 100. The cabinet leaves 92 are fastened in the slots 22 of the center post 50 and horizontal tie member 56 by use of bolts 34 which extend through the mounting apertures 100, 102 in the flanges 98 and lock in nuts 36. As best seen in FIG. 9, aperture 102 adjacent the juncture of the flange is elongate so as to permit substantial vertical adjustment and to enable disposition of the leaf 92 beyond the lower end of the center post 50 for concealment of the edge of the platform and to enable fastening of the leaf in both the tie member 56 and post 50. The mounting flange 100 of the door leaf is attached to the door by wood screws 44 extending through the mounting apertures 104 and into the door.

Latching of the doors is effected by magnetic cabinet latches 95 which are secured in the slots of the tie members 54, 56 by the bolts 34 and nuts 36, and which cooperate with metal plates (not shown) on the back of the doors.

In the illustrated embodiment, a novel hinge assembly is utilized for rapid mounting and demounting of the doors wherein the pivot pin 94 is of greater length than the pivot pin 96. The pivot pins 94, 96 are secured in one leaf maintained firmly seated in an aperture of the cooperating hinge leaf by a spacer member 103 which seats between the leaves of the hinge 86 having the longer pin 94. Further details on the novel hinge construction are disclosed in the copending application of Edmund F. Reiss, filed concurrently herewith, Serial No. 99,867.

Referring to the corner post assembly best shown in FIGS. 4 and 16, when it is desired to have the cabinet installation extend about a corner, a corner insert post 105 is conveniently employed to permit spacing of the vertical posts 52 forming the corner supports for the cabinet sections from the point of intersection to untilize corner mounted doors. The insert post 105 is an extruded member of generally M-shaped configuration and is provided along its side edges with an L-shaped boss 106 which seats in the slot 22 with one leg thereof extending normally in the channel portion 24 and the other leg locking in the locking portion 26 behind one of the shoulders 28 so as to prevent removal by movement laterally outwardly of the posts 52 and require insertion or removal from the posts 52 by sliding it along the length of the slots 22. The top and bottom corners of the insert post 105 are notched out, as designated by the numeral 107 in FIG. 4, to enable mounting of the hinges 86, 88. The hinges 86, 88 lock the insert post 105 in position against vertical movement. If so desired, an unnotched corner insert post may be untilized when desired, and it may be locked from vertical movement in the corner posts of a wall cabinet by bolts 34 and nuts 36 inserted at the lower end thereof.

Figure 2:
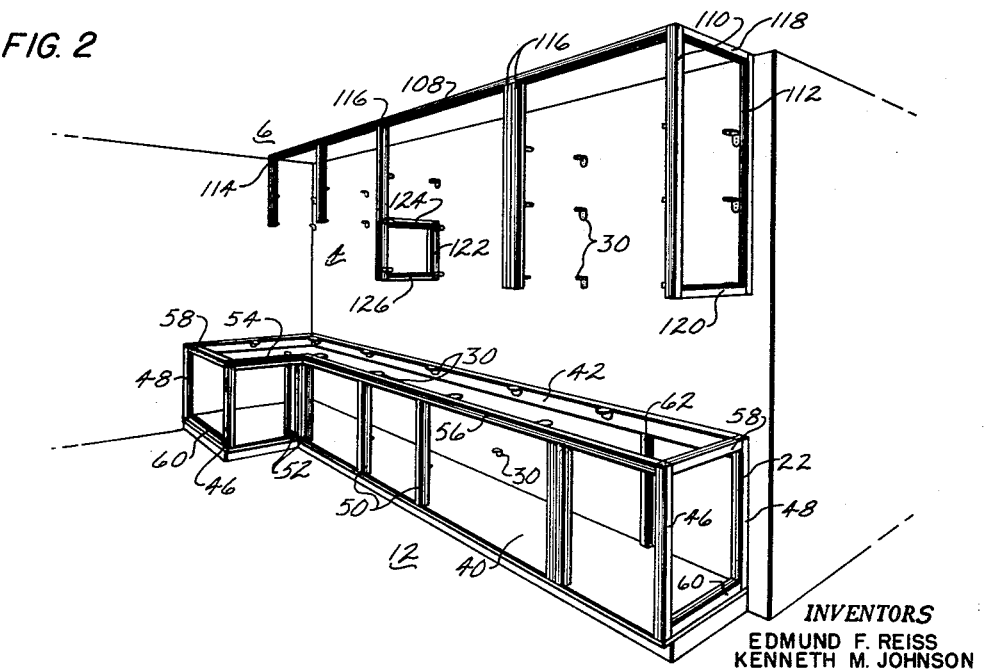
FIG. 2 is the skeletal framework of the cabinet installation in FIG. 1.

Referring now to the illustrated embodiment of a wall cabinet construction utilizing the components and modular construction of the present invention, and the particular reference to FIGS. 2, 3, and 15, a horizontal header 108 is secured by a plurality of angle brackets 30 spaced along its length to the ceiling 6, which may be a false ceiling or other structure providing a horizontal planar support for the cabinet. If so desired, a filler strip (not shown) may be inserted in the vertical space between the header 108 and ceiling 6. A pair of end wall posts 110, 112 having slots 22 in opposed alignment are secured in position to provide the end wall skeleton. The rear end post 112 is secured directly to the ceiling 6 and to the wall 4 by brackets 30, and the front end post 110 is secured to the end of header 108 by a bracket 30. The corner post 114 at the opposite end of the header 108 and intermediate or center posts 116 depend from the header and are similarly secured thereto by brackets 30.

The end wall frame or skeleton is preferably squared by upper facing member 118, which is secured at its front end to the header 108 and along its length to the ceiling 6 by brackets 30 secured in its inwardly facing slot 22, and by the lower facing member 120 which is inserted lastly and fastened by brackets 30 to the shelf 66. The facing members 118, 120 have slots in opposed alignment and in alignment with the slots of the end wall posts 110, 112, and the end wall panel 113 is seated in the aligned slots of the end wall frame defined thereby.

A short stile 122 is secured to the wall 4 by brackets 30 with a slot 22 thereof in opposed alignment with a slot of the center post 116. The top facing member 124 extends between the short stile 122 and center post 116 and may be fastened by brackets 30 at its front end to the center post 116 and its rear end to the wall 4, or to the shelf above it. The bottom facing member 126 extends between the lower end of the short stile 122 and center post 116 and is fastened by brackets 30 to the shelf 66 and to the wall 4. These facing members 124, 126 have slots 22 in opposed alignment and in alignment with the aligned slots 22 of the post 116 and stile 122. The short end panel 128 is seated in the slots 22 of the post 116, stile 122, and top facing member 118 and then the bottom facing member 126 is fastened in place with the panel 128 seated in the slot thereof so as to hold the panel in position and frame the edges thereof.

Brackets 30 are fastened at spaced points along the wall 4 and into the slots 22 of the posts 114, 116 for supporting the shelves 66. At the end wall post 110 and the lower portion of the center post 116 carrying the short end panel 128, the brackets 30 are fastened into a side slot 22 of the post and into the edge of the shelves 66, as described and illustrated in connection with the base cabinet construction. The shelves 66 are secured to the brackets 30 by wood screws 44 and tie the several vertical posts together and to the wall 4 so as to provide a rigid assembly.

The hinges 86, 88 pivotally mount the doors 8 to the posts 110, 114, 116 and are preferably applied thereto with the hinge 86 having the removable spacer 103 in the lower position so as to facilitate mounting and demounting of the doors.

As will be readily appreciated, modifications in the illustrated enclosure embodiments may be readily effected by variation in the assembly of the several components. For instance, the wall mounted brackets 30 for supporting the shelves may be replaced by wood stringers or ledger strips. Also, the wood stringer 42 in the base cabinet 10 can be replaced by the extruded structural member 20 of the present invention if so desired. Drawers and doors can be combined in the same vertical cabinet section if so desired, and the countertop 68 may be provided with apertures for installation of sinks, ranges and other built-in appliances.

If so desired, the platform 40 for the base cabinet may be omitted and the several stiles or posts secured directly to the floor by the brackets 30 with the bottom shelf 66 and the lower edge of the doors 14 spaced upwardly therefrom. In this manner, a contemporary cabinet design can also be provided wherein the lower portion of the posts or stiles serve as legs to space the enclosed portion from the floor.

Although an extruded structural member of square cross-section may be employed, the rectangular configuration illustrated is preferred to minimize cost by reducing the amount of metal needed to provide a rectilinear structure having at least three slots while simultaneously providing a web of sufficient strength. As can be seen, the slots in the longer sides are spaced rearwardly of the slot in the short side to ensure a strong connecting web. All four faces of the extension may be slotted depending upon the size and strength considerations, but the illustrated three-slot design is desirable in that an unbroken surface is thus available for placement at the outside edges of the enclosure.

Although the extrusions are most conveniently precut to standard lengths, a large contractor or a person desiring an unusual installation can readily obtain long extruded lengths and cut them to the desired size.

Referring now to the mode of assembly of the enclosures in the illustrated embodiment, the desired installation is predetermined, and therefrom the location of the various stiles and rails for mounting of the doors and drawers is plotted. Since the wall cabinet is to be suspended from the ceiling through the horizontal header 108, blocking is most desirably employed between the ceiling joists or trusses if the ceiling joists run parallel to the header to provide a firm support into which the brackets 30 may be fastened.

Initially, the base platform 40 is constructed and the shelf bracket heights are marked on the wall, conveniently by using a chalk line. The wall brackets 30 for supporting the shelves 66 in both wall cabinet 2 and base cabinet 4 are then fastened therein by wood screws.

The horizontal stringer 42 is fastened to the wall 4 at the proper height and the brackets 30 are secured therein for fastening the countertop 68 along its rear edge. The header 108 is then assembled with mounting brackets 30 in the slot to be disposed rearwardly at points spaced along its length, and generally at least every three feet. The shelf support brackets 30 and lower hinge leaves 92 are secured into the slots 22 of the several posts 114, 116, and one leg of the mounting brackets 30 is secured at their upper ends while the bolts 34 and nuts 36 are assembled loosely in the other leg thereof. The latch members 95 are similarly loosely assembled with nuts and bolts, and then the loosely assembled nuts and bolts in the legs of the brackets for mounting the posts 114, 116 and in the latching members 95 are inserted in the slots of the header 108 and slid along the header 108 to the predetermined position and locked in place by tightening the bolts. This operation is conveniently done on the floor and then the sub-assembly is raised into place upon the ceiling 6 and fastened thereto by wood screws 44. The short stile 122 is fastened to the wall 4 by angle brackets 30, and the shelves 66 are then inserted into place from the ends of the enclosure and fastened to the several shelf brackets 30 by wood screws 44.

The rear end wall post 112 is secured to the wall 4 by angle brackets 30 with a slot 22 thereof facing forwardly, and the upper facing member 118 is secured to the ceiling 6 and to the header 108 by angle brackets 30. Then the front end wall post 110 is secured to the header 108 by bracket 30 with a slot thereof facing rearwardly in opposed alignment with the forwardly facing slot of the rear end wall post 112. The shelf brackets 30 of the posts 110, 112 are fastened into the edges of the several shelves 66. The end panel 113 is inserted into the aligned slots 22 of the end wall posts 110, 112 and slid upwardly into the slot 22 of the upper facing member 118, after which the lower facing member 120 is slipped into place with the end panel 113 seated in the top slot thereof. Angle brackets 30 on the facing member 120 are then fastened to the lower shelf 66 to lock the panel in place.

Next, the top facing member 124 is secured to the shelf 66 with a slot thereof facing downwardly in alignment with aligned slots of the center post 116 and short stile 122. The short end panel 128 is then slid into position and locked into place by the lower facing member 126 which is secured to the lower shelf 66 by angle brackets 30.

Lastly, the door leaves 90 are mounted upon the doors 8 which are then mounted into the cabinet leaves 92 and fastened into place by the spacers 103 to complete the wall cabinet assembly.

Referring to the mode of assembly for the base cabinet, the left hand rear end wall post 48 is secured to the platform 40 and to the horizontal stringer 42. The base mounting brackets 30, lower cabinet hinge leaves 92 and shelf mounting brackets 30 are fastened into place in the left hand corner post 46, the corner posts 52 and center posts 50. In the instance of the corner posts 52, the insert post 105 is seated in outwardly facing slots thereof.

The right hand end wall posts 46, 48 are assembled with their base mounting brackets 30, and the horizontal drawer runners 64 are secured thereto. The drawer support post 62 and cooperating center post 50 are similarly assembled with base mounting brackets 30, shelf mounting brackets 30, and horizontal drawer runners 64, and the lower cabinet hinge leaf 92 is also fastened into the center post 50. These sub-assemblies are then erected at their predetermined locations by fastening the base mounting brackets 30 to the platform 40 by wood screws 44, and, in the case of the posts 48 and 62, also to the wood stringer 42 and/or wall 4 by wood screws 44. The base framing members 60 are also fastened to the platform 40 between the end wall posts 46, 48, and the end wall panels 70 are seated in the aligned slots thereof. The insertion of the right end panel 70 prior to erection of the end wall sub-assembly may be particularly essential if insufficient vertical clearance is available for inserting the panel after erection.

The shelves 66 are fastened into place by wood screws 44 to the shelf mounting brackets 30 and thus tie the front posts to the wall 4 and provide a rigid assembly. The horizontal tie members 54, 56 are assembled with cabinet latches 95, upper cabinet hinge leaves 92, and mounting brackets 30 for fastening to the several stiles and those for fastening to the countertop 68. The nuts and bolts in the lower aperture 100 of the cabinet leaves 92 and other leg of the post mounting brackets 30 are secured loosely and these bolts and nuts are then slid vertically into the slots of the already mounted stiles, after which the bolts are tightened to provide a rigid assembly. The front-to-back tie members 58 are secured in place to complete the framework.

The countertop 68 is then seated on top of the framework and fastened in place upon the brackets 30 by wood screws 44. The doors 14 are seated in the cabinet leaves 92 and fastened by the spacers 103. A pair of drawer guides 72 are fastened to the rear end of the drawers 16 and the front drawer guides 72 fastened into the front end of the drawer runners 64 to complete the assembly.

During assembly, misalignment of the walls presents no significant problem since the several stiles are plumbed and the various rails levelled during erection. The extruded members and components secured thereto may be adjusted readily by loosening the bolts and making whatever correction is necessary to secure proper vertical or horizontal alignment. If so desired, jigs may be used for preassembling the structural members and components into sub-assemblies and for laying out the shelf bracket pattern upon the wall.

Thus, it can be seen that the modular enclosure of the present invention is comprised of a minimum of components which are of wide versatility in their application in the modular enclosure, and enable a wide range of enclosure design of highly pleasing appearance, including lavatory installations, room dividers, standing cabinets and the like. Panels are readily supported in the slots of the structural members to provide solid wall surfaces at any desired location.

Speedy and facile erection upon the job site can be effected even by relatively inexperienced workmen, and misalignment in walls or in the several elements is easily correctible. The components may be shipped completely disassembled and prefinished with the attendant savings in transportation costs, damage in transit, and on-the-job site labor. However, if so desired, sub-assemblies of the components can be fabricated in the shop upon precision jigs by large contractors for shipment to the job site in partially assembled form.

The extruded structural members, fasteners, etc., may be provided with any desired surface finish. Extruded aluminum members with brushed finish or various anodized finishes are most appealing and versatile in application while providing a lightweight unit of relatively low cost and high durability. A wide variety of materials and finishes may be utilized for the panels, doors, drawers, etc., to harmonize with the decor of the surroundings.

As will be apparent to persons skilled in the art, various modifications and adaptations of the structure above described will become readily apparent without departure from the spirit and scope of the invention, the scope of which is defined in the appended claims.

We claim:

1. A modular enclosure for use with a horizontal planar surface including a plurality of elongate structural members of rectilinear cross section defining at least two mutually perpendicular faces each having a slot extending longitudinally therein, a number of said structural members extending vertically of the horizontal planar surface and the remainder of said structural members extending horizontally of said vertically extending members to define a skeletal framework for the enclosure, at least one pair of said vertically extending members being spaced apart with slots thereof in opposed alignment to define a wall skeleton; means fastening said horizontally extending members and vertical extending members in right angular assembly with said horizontally extending members abutting said vertically extending members and lying substantially in the same plane as the vertically extending members, said means including a right angle bracket having a pair of legs with apertures registering with the slots of members to be connected and fastening members extending through said apertures of the bracket and engaged in said slots; means for fastening said structural members to the horizontal planar surface including right angle brackets having one leg with its aperture registering with a slot of said structural members and its other leg extending laterally along the planar surface for engagement of the structural members therewith in rigid assembly and a fastening member extending through said one leg and engaged in said slot; and a panel seated in the aligned slots of said pair of vertically extending members defining the wall skeleton to provide a fixed wall for the enclosure.

2. An enclosure in accordance with claim 1 having a pair of sections disposed in right angularity each having a vertically extending member providing a corner post with the corner posts of the two sections being spaced apart; and an elongate insert post of generally M-shaped cross section having projecting portions along its side edges engaged in slots of said corner posts.

3. A modular enclosure for use with a horizontal planar surface including a plurality of elongate structural members of rectilinear cross section defining at least two mutually perpendicular faces each having a slot extending longitudinally therein, a number of said structural members extending vertically of the horizontal planar surface to provide stiles and the remainder of said structural members extending horizontally of said vertically extending members to provide rails and define a skeletal framework for the enclosure, said stiles including at least one pair in spaced apart relationship with slots thereof in opposed alignment to define a wall skeleton; means fastening said horizontally extending members and vertical extending members in right angular assembly with said horizontally extending members abutting said vertically extending members and lying substantially in the same plane as the vertically extending members, said means including a right angle bracket having a pair of legs with apertures registering with the slots of members to be connected and fastening members extending through said apertures of the bracket and engaged in said slots; means for fastening said structural members to the horizontal planar surface including right angle brackets having one leg with its aperture registering with a slot of said structural members and its other leg extending laterally along the planar surface for engagement of the structural members therewith in rigid assembly and a fastening member extending through said one leg and engaged in said slot; a panel seated in the aligned slots of said pair of vertically extending members defining the wall skeleton to provide a fixed wall for the enclosure; a door; and means pivotally mounting said door upon a stile including a pair of hinges and fastening members engaged in a slot of the stile.

4. In a modular enclosure for use with a horizontal planar surface, the combination comprising a plurality of elongate structural members of rectilinear cross section defining four faces and having slots extending longitudinally in three faces thereof, a number of said structural members extending vertically from the horizontal planar surface and the remainder of said structural members extending horizontally of said vertically extending members to define a skeletal framework for the enclosure, said structural members including at least one pair of vertically extending members in spaced apart relationship with slots thereof in opposed alignment to define an end wall skeleton, a top frame member extending horizontally across the upper front of the skeleton from said end wall skeleton, and at least one intermediate post extending vertically from said top frame member; fastening means secured in the slots of said structural members including angle brackets having right angularly disposed legs with apertures therein registrable with the slots of structural members to be joined in right angularity and threaded members extending through said bracket apertures and engaged in said slots, a number of said fastening means securing said horizontally extending members to said vertically extending members in rigid right angular assembly, and a number of said fastening means having one leg of the brackets secured in a slot of structural members adjacent the planar surface and the other leg extending parallel to the horizontal planar surface for engagement of the structural members therewith in rigid assembly; a vertical panel seated in the aligned slots of said pair of vertically extending members defining the end wall skeleton to provide an end wall for the enclosure; a door; means pivotally mounting said door at an intermediate post including a pair of hinges having an enclosure mounting leaf with a right angularly disposed mounting flange, said mounting flange having an elongated aperture adjacent the juncture of said mounting flange and a second aperture spaced vertically outwardly therefrom, the mounting flange of the upper enclosure leaf having its second aperture aligned with a slot of a stile across which said top frame member extends and its elongated aperture aligned with a slot of the top frame member and the lower enclosure leaf having its mounting apertures in alignment with the apertures of the upper leaf and with the slot of said stile, bolts extending through said mounting apertures and into the slots of said frame member and stile, and nuts in the slots of said frame member and stile engaged with said bolts.

5. A modular enclosure for use with a horizontal planar surface including a plurality of elongate structural members having a rectilinear cross section defining four faces and slots extending longitudinally in three faces thereof, each of said slots having a channel portion extending normally to the face and a locking portion extending parallel to the face intermediate the length of said channel portion to provide shoulders on opposite sides thereof, a number of said structural members extending vertically from said horizontal planar surface to provide stiles and the remainder of said structural members extending horizontally of said vertically extending members to provide rails and define a skeletal framework for the enclosure, said stiles including at least one pair in spaced apart relationship with slots thereof in opposed alignment to define a wall skeleton; fastening means for securing said stiles and rails in right angular assembly, said means comprising a bracket having a pair of legs with apertures registering with the slots of said members to be connected and defining a right angle, bolt members having a shank portion extending through the aperture of the brackets and into said slots, nut members in said locking portions of the slots threadably engaged with said bolt members and in firm engagement with the shoulders of the locking portion of said slots; a panel seated in the aligned slots of said pair of stiles defining the wall skeleton to provide a fixed wall for the enclosure; and additional fastening means for securing said structural members to the horizontal planar surface, said fastening means having one leg of the brackets secured in a slot of said members adjacent the horizontal planar surface and the other leg extending parallel to the planar surface for engagement of the structural members therewith in rigid assembly.

6. A modular enclosure in accordance with claim 5 wherein said nut members have a dish-shaped base portion in engagement with said shoulders of the locking portion of the slot and a threaded cylindrical portion, said dish-shaped portion having a radially extending projection butting against the side wall of said locking portion to limit rotation of said nut member.

7. A modular enclosure in accordance with claim 5 having a pair of right angularly extending sections each having a stile providing a corner post with an outwardly facing slot, said corner posts being spaced from the point of intersection of the two enclosure sections; and an elongate insert post of generally M-shaped configuration seated in the outwardly facing slots of said corner posts, the side margins of said insert having an L-shaped boss extending into the channel portion of said slots and laterally into the locking portion thereof to limit movement of the insert post laterally of the corner posts.

8. A modular base cabinet enclosure for mounting upon a floor or the like defining a base surface including a plurality of elongate structural members having a rectilinear cross section defining four faces with slots extending longitudinally in three faces thereof, a number of said structural members extending vertically from the base surface to provide stiles and the remainder of said structural members extending horizontally of said vertically extending members to provide rails and define a skeletal framework for the enclosure, said stiles including at least two pair in spaced parallel relationship to define front posts and rear posts of a rectilinear unit, and said rails including at least one pair extending between and inwardly of the front and rear posts in parallel relationship to provide drawer runners, said stiles including a pair in spaced apart relationship with slots thereof in opposed alignment at one end of the skeletal framework to define an end wall skeleton; fastening means secured in the slots of said structural members including angle brackets having right angularly disposed legs with apertures therein registrable with the slots of stiles and rails to be joined in right angularity, and threaded members extending through said bracket apertures and engaged in said slots, a number of said fastening means securing said stiles to said rails in rigid right angular assembly, and a number of said fastening means having one leg of the brackets secured in a slot of the structural members adjacent the base surface surface and the other leg extending parallel to the base surface for engagement of the structural members therewith in rigid assembly; a drawer slideable upon said drawer runners between said front and rear posts; a door; means pivotally mounting said door at one of said stiles including a pair of hinges having an enclosure mounting leaf with a right angularly disposed mounting flange having mounting apertures therein and threaded fasteners extending through apertures of the mounting flange of said enclosure leaves and engaged in a slot of said stile to pivotally mount said door thereon; a vertical panel seated in the aligned slots of said one pair of stiles defining the end wall skeleton to provide an end wall for the enclosure; a countertop seated upon said structural members; additional fastening means securing said countertop to said structural members, the brackets of said fastening means having one leg secured to said structural members adjacent the countertop by a threaded fastener engaged in a slot thereof and the other leg extending parallel to the lower surface of said countertop; and means fastening said other leg of the brackets to said countertop.

9. A modular base cabinet enclosure for mounting upon a floor or the like defining a base surface including a plurality of elongate structural members having a rectilinear cross section defining four faces with generally T-shaped slots extending longitudinally in three faces thereof, a number of said structural members extending vertically from the base surface to provide stiles and the remainder of said structural members extending horizontally of said vertically extending members to provide rails and define a skeletal framework for the enclosure, said stiles including a pair at one end of the skeletal framework in spaced apart relationship with slots thereof in opposed alignment to define an end wall skeleton and said rails including an upper front frame member extending from said end wall skeleton and across the top of at least one of said stiles; fastening means secured in the slots of said structural members including angle brackets having right angularly disposed legs with apertures therein registrable with the slots of stiles and rails to be joined in right angularity, bolts extending through said bracket apertures and into said slots and nuts seated in said slots and threadably engaged with said bolts, a number of said fastening means securing said stiles to said rails in rigid right angular assembly, and a number of said fastening means having one leg of the brackets secured in a slot of the structural members adjacent the base surface and the other leg extending parallel to the base surface for engagement of the structural members therewith in rigid assembly; a vertical panel seated in the aligned slots of said end wall skeleton; a door; means pivotally mounting said door on said structural framework including a pair of hinges having an enclosure mounting leaf with a right angularly disposed mounting flange, said mounting flange having an elongated aperture adjacent the juncture of said mounting flange and a second aperture spaced vertically outwardly therefrom, the mounting flange of the upper enclosure leaf having its second aperture aligned with a slot of a stile across which said top frame member extends and its elongated aperture aligned with a slot of the top frame member and the lower enclosure leaf having its mounting apertures in alignment with the apertures of the upper leaf and with the slot of said stile, bolts extending through said mounting apertures and into the slots of said frame member and stile, and nuts in the slots of said frame member and stile engaged with said bolts; a countertop extending horizontally across the top of said structural framework; additional fastening means for securing said countertop to said top frame member spaced along the length thereof, said fastening means having one leg of the bracket disposed vertically along the inside surface of the top frame member and secured in a slot thereof and its other leg extending horizontally inwardly along the lower surface of said countertop; and means securing said other leg of the brackets to said countertops to provide a rigid assembly.

10. A drawer guide for use in combination with a horizontal drawer runner having a channel extending longitudinally in a side thereof, said drawer guide being composed of a synthetic plastic material having a low coefficient of friction and having a base portion slideable upon the top surface of an associated drawer runner, an upstanding portion along one side margin of the base portion for extension along the side of an associated drawer and engagement therewith, and a depending portion along the other side margin for extension along the inside surface of the associated drawer runner, said depending portion having a lug for projection inwardly of the channel therein.

11. A modular wall cabinet enclosure for use with a ceiling surface including a plurality of elongate structural members having a rectilinear cross section defining four faces with slots extending longitudinally in three faces thereof, a number of said structural members extending vertically of the ceiling surface to provide stiles and the remainder extending horizontally of said vertically extending members to provide rails and define a skeletal framework for the enclosure, said rails including a header member extending along the ceiling surface at the upper front of said skeletal framework, said stiles including a front end post extending downwardly from the ceiling surface at one end of the header member and a rear end post spaced therefrom to define an end wall skeleton extending normally to the header member, said end posts having slots in opposed alignment, said stiles further including at least one intermediate post extending normally from said header member intermediate its length; fastening means secured in slots of said structural members including angle brackets having right angularly disposed legs with apertures therein registrable with slots of stiles and rails to be joined in right angularity and bolts extending through said bracket apertures and engaged in said slots, a number of said fastening means securing said stiles to said rails in rigid right angular assembly and a number of said fastening means having one leg extending vertically along the inside surface of said header member and engaged in a slot thereof and the other leg extending laterally along the ceiling surface for engagement therewith; a vertical panel seated in the aligned slots of said end wall skeleton; additional fastening means mounted on said stiles for securing shelves thereto, the angle brackets having one leg secured in a slot of the stiles and the other leg for engagement with a shelf; a door; and means pivotally mounting said door at an intermediate post including a pair of hinges having an enclosure mounting leaf with a right angularly disposed mounting flange, said mounting flange having an elongated aperture adjacent the juncture of said mounting flange and a second aperture spaced vertically outwardly therefrom, the apertures in the flange of the lower enclosure leaf and the second aperture of the upper enclosure leaf being aligned with an outwardly facing slot in said one intermediate post and the elongated aperture of the upper enclosure leaf registering with an outwardly facing slot in the header member, and bolts extending through said apertures and engaged in said slots.

12. A modular wall cabinet enclosure for mounting on a ceiling surface and a side wall including a plurality of elongate structural members of rectilinear cross section with generally T-shaped slots extending longitudinally in three faces thereof, a number of said structural members extending vertically of the ceiling surface to provide stiles and the remainder of said structural members extending horizontally of said vertically extending members to provide rails and define a skeletal framework for the enclosure, said rails including a header member extending horizontally along the ceiling surface and spaced outwardly from and parallel to the side wall to provide the top frame member for the enclosure, said stiles including a front end post extending vertically from the ceiling at one end of said header and a rear end post extending along the side wall from the ceiling with slots thereof in opposed alignment to define an end wall skeleton for the enclosure extending normally to the side wall, said stiles further including intermediate posts extending vertically from said header intermediate the length thereof, and said rails including a bottom facing member extending horizontally between the lower ends of the end posts defining the end wall skeleton; fastening means secured in the slots of said structural members including angle brackets with right angularly disposed legs with apertures therein registrable with the slots of stiles and rails to be joined in right angularity, bolts extending through said bracket apertures and into said slots, and nuts seated in said slots and threadably engaged with said bolts, a number of said fastening means securing said stiles to said rails in rigid right angular assembly and a number of said fastening means having one leg of the angle bracket extending vertically along the inside surface of the header member and engaged in a slot therein, and the other leg extending horizontally along the ceiling surface for engagement therewith; at least two shelves extending horizontally between said stiles; additional fastening means for securing said shelves and stiles in rigid assembly, said fastening means having one leg of the bracket secured in a slot of the stile and the other leg extending along the surface of a shelf, means fastening the said other legs of the shelf mounting brackets to said shelves; a vertical panel seated in the aligned slots of said end wall skeleton and a rail member extending across the bottom thereof; a door; and means pivotally mounting said door at an intermediate post including a pair of hinges having an enclosure mounting leaf with a right angularly disposed mounting flange, said mounting flange having an elongated aperture adjacent the juncture of said mounting flange and a second aperture spaced vertically outwardly therefrom, the apertures in the flange of the lower enclosure leaf and the second aperture of the upper enclosure leaf being aligned with an outwardly facing slot in said one intermediate post and the elongated aperture of the upper enclosure leaf registering with an outwardly facing slot in the header member, and bolts extending through said apertures and engaged in said slots.

13. A modular base cabinet enclosure for mounting upon a floor or the like defining a base surface and a side wall including a plurality of elongate structural members having a rectilinear cross section defining four faces with generally T-shaped slots extending longitudinally in three faces thereof, a number of said structural members extending vertically of the base surface to provide stiles and the remainder of said structural members extending horizontally of said vertically extending members to provide rails and define a skeletal framework for the enclosure, said rails including a top frame member extending laterally across the upper front of said skeletal framework and spaced outwardly from the wall and upwardly from the base surface, said stiles including a front end post extending between the base surface and one end of the top frame member and a rear end post extending along the side wall to define an end wall skeleton extending normally to the side wall, said end posts having slots thereof in opposed alignment, said stiles further including intermediate posts extending between the base surface and the top frame member and a rear post extending along the side wall in alignment with the intermediate post adjacent said end wall skeleton to define a rectilinear drawer support unit in conjunction therewith, said rails further including at least one pair extending horizontally of the front and rear posts of said drawer support unit and inwardly thereof in parallel relationship to provide drawer runners; fastening means secured in the slots of said structural members including angle brackets having right angularly disposed legs with apertures therein registrable with the slots of stiles and rails to be joined in right angularity, bolts extending through said bracket apertures and into said slots, and nuts seated in said slots and threadably engaged with said bolts, a number of said fastening means securing said stiles to said rails in rigid right angular assembly, and a number of said fastening means having one leg of the bracket secured in a slot of the structural members adjacent the base surface and the other leg extending parallel to the base surface for engagement of the structural members therewith in rigid assembly; at least two shelves extending horizontally between intermediate posts in spaced apart relationship; additional fastening means for securing said intermediate posts and said shelves in rigid assembly, said fastening means having one leg of the bracket secured in a bracket slot of the intermediate posts and the other leg extending along a surface of a shelf; means fastening said other legs of said shelf mounting brackets to said shelves; means for fastening the rearward portion of said shelves to the side wall; a vertical panel seated in the aligned slots of said end wall skeleton; a drawer slideably carried upon said drawer runner; a door; means pivotally mounting said door at an intermediate post including a pair of hinges having an enclosure mounting leaf with a right angularly disposed mounting flange, said mounting flange having an elongated aperture adjacent the juncture of said mounting flange and a second aperture spaced vertically outwardly therefrom, the apertures in the flange of the lower enclosure leaf and the second aperture of the upper enclosure leaf being aligned with an outwardly facing slot in the intermediate post and the elongated aperture of the upper enclosure leaf being aligned with an outwardly facing slot in the top frame member, bolts extending through said apertures and into said slots, and nuts seated in said slots and engaged with said bolts; a countertop extending horizontally across the top of said structural framework; additional fastening means for securing said countertop to said top frame member spaced along the length thereof, said fastening means having one leg of the bracket disposed vertically along the inside surface of the top frame member and secured in an inwardly facing slot thereof and its other leg extending horizontally inwardly along the lower surface of said countertop; means securing the other leg of said countertop fastening means to said countertop in rigid assembly; and means for fastening the rear side of said countertop to the side wall including spaced right angle brackets fastened to the undersurface thereof.

14. A modular base cabinet enclosure for mounting upon a floor or the like defining a base surface including a plurality of elongate structural members having a retilinear cross section defining four faces with slots extending longitudinally in three faces thereof, a number of said structural members extending vertically from the base surface to provide stiles and the remainder of said structural members extending horizontally of said vertically extending members to provide rails and define a skeletal framework for the enclosure, said stiles including at least two pair in spaced parallel relationship to define front posts and rear posts of a rectilinear unit, and said rails including at lease one pair extending between and inwardly of the front and rear posts in parallel relationship with a slot thereof in opposed parallel alignment to provide drawer runners, said stiles including a pair in spaced apart relationship with slots thereof in opposed alignment with one end of the skeletal framework to define an end wall skeleton; fastening means secured in the slots of said structural members including angle brackets having right angularly disposed legs with apertures therein registrable with the slots of stiles and rails to be joined in right angularity, and threaded members extending through said bracket apertures and engaged in said slots, a number of said fastening means securing said stiles to said rails in rigid right angular assembly, and a number of said fastening means having one leg of the brackets secured in a slot of the structural members adjacent the base surface and the other leg extending parallel to the base surface for engagement of the structural members therewith in rigid assembly; a drawer; drawer guides of synthetic plastic material having a low coefficient of friction slideably mounting said drawer upon said drawer runners, said drawer guides having a base portion slideable upon the top surface of said runners and extending along the bottom of the drawer, an upstanding portion along the outer side margin extending upwardly along the side of said drawer, and a depending portion at the inner side portion extending downwardly along the inner surface of the drawer runner with a lug thereon projecting inwardly of the aligned slot to limit movement of the drawer vertically of the runner; a door; means pivotally mounting said door at one of said stiles including a pair of hinges having an enclosure mounting leaf with a right angularly disposed mounting flange having mounting apertures therein and threaded fasteners extending through apertures of the mounting flange of said enclosure leaves and engaged in a slot of said stile to pivotally mount said door thereon; a vertical panel seated in the aligned slots of said one pair of stiles defining the end wall skeleton to provide an end wall for the enclosure; a countertop seated upon said structural members; additional fastening means securing said countertop to said structural members, the brackets of said fastening means having one leg secured to said structural members adjacent the counter top by a threaded fastener engaged in a slot thereof and the other leg extending parallel to the lower surface of said counter top; and means fastening said other leg of the brackets to said countertop.

15. For use in a modular enclosure, a plurality of elongated structural members each having at least a pair of faces extending at right angles to each other, an elongated uninterrupted slot in each of said pair of faces and extending substantially from one end of the members to the other, an L-shaped bracket member having a pair of apertures selectively registrable with the slots of said members to be connected thereto, a pair of bolt members each having a shank portion extending through the apertures of the bracket and into associated slots of said structural members with the associated slots thereof lying in the same plane, and means for securing the bolt members to the structural members to retain the structural members together, and a third elongated structural member having an uninterrupted slot extending between the ends thereof, said third member being positioned in abutting relationship with one of said pairs of members and with the slot of the third member lying substantially in the same plane as the other slot of said one of the pairs of members, and means connecting said third and said one of the pairs of members together including a second L-shaped bracket having a pair of apertures respectively registered with said slot in the third member and said other slot of said one of the pairs of members.

16. A modular enclosure for use with a horizontal planar surface including a plurality of elongate structural members of rectilinear cross section defining at least two mutually perpendicular faces, each having a slot extending longitudinally therein, a number of said structural members extending vertically of the horizontal planar surface and the remainder of said structural members extending horizontally of said vertically extending members to define a skeletal frame-work for the enclosure, at least one pair of said vertically extending members being spaced apart with slots thereof in opposed alignment to denfie a wall skeleton, means fastening said horizontally extending members and vertically extending members in right angular assembly including a right angle bracket having a pair of legs with apertures registering with the slots of members to be connected and fastening members extending through said apertures of the bracket and engaged in said slots, means for fastening said structural members to the horizontal planar surface including right angle brackets having one leg with an aperture registering with a slot of said structural members and its other leg extending laterally along a planar surface for engagement of the structural members therewith in rigid assembly and a fastening member extending through said one leg and engaged in said slot, a panel seated in the aligned slots of said pair of vertically extending members defining the wall skeleton to provide a fixed wall for the enclosure, said structural members including four vertically extending members arranged in spaced parallel relationship to define front posts and rear posts of a rectilinear unit, and at least one pair of said horizontally extending members secured to the front and rear posts in parallel relationship to provide a drawer runner, and a drawer slideably carried upon said drawer runners and having a guide means slideably received in the slot of the drawer runner.

17. In a modular enclosure, the combination comprising a plurality of elongated structural members each having at least a pair of mutually perpendicular faces and an elongated uninterrupted slot in each of the faces respectively, one of said structural members extending vertically and two other structural members extending horizontally and abutting said vertically extending member on the slotted faces thereof respectively, said horizontally extending members lying substantially in the same plane as the vertically extending member with one of the slots of each of the horizontally extending members lying substantially in the same plane as one of the slots of the vertically extending member, and means connecting the horizontally extending members to the vertically extending member including two L-shaped brackets respectively associated with one of the horizontally extending members and the vertically extending member, said brackets each having two apertures respectively registered with one of the slots of the vertically extending member and one of the slots of the associated horizontally extending member, and bolts respectively received through the apertures of the bracket members and the slots of said vertically and horizontally extending members.

(References on following page)

References Cited by the Examiner

UNITED STATES PATENTS

| | | | |
|---|---|---|---|
| 1,608,592 | 11/26 | Funk. | |
| 2,290,035 | 7/42 | Conwell | 312—109 X |
| 2,301,306 | 11/42 | McDonald. | |
| 2,329,815 | 9/43 | Attwood | 189—36 X |
| 2,380,379 | 7/45 | Attwood | 312—257 X |
| 2,466,869 | 4/49 | Triller | 312—257 X |
| 2,696,419 | 12/54 | Wallance | 312—257 |
| 2,757,051 | 7/56 | Wilmer | 308—3.6 |
| 2,759,773 | 8/56 | Wilmer | 308—3.6 |
| 2,940,718 | 6/60 | Beal | 248—245 |
| 2,966,385 | 12/60 | Murphy | 312—257 |
| 3,059,983 | 10/62 | Strom | 312—257 |

FRANK B. SHERRY, *Primary Examiner.*

GEORGE L. BREHM, *Examiner.*